United States Patent
Subramanian

(10) Patent No.: US 10,262,024 B1
(45) Date of Patent: Apr. 16, 2019

(54) PROVIDING CONSISTENT ACCESS TO DATA OBJECTS TRANSCENDING STORAGE LIMITATIONS IN A NON-RELATIONAL DATA STORE

(71) Applicant: Amazon Technologies, Inc., Seattle, WA (US)

(72) Inventor: Venkataramanan Subramanian, Telangana (IN)

(73) Assignee: Amazon Technologies, Inc., Seattle, WA (US)

( * ) Notice: Subject to any disclaimer, the term of this patent is extended or adjusted under 35 U.S.C. 154(b) by 961 days.

(21) Appl. No.: 14/716,711

(22) Filed: May 19, 2015

(51) Int. Cl.
*G06F 17/30* (2006.01)

(52) U.S. Cl.
CPC .. *G06F 17/30371* (2013.01); *G06F 17/30109* (2013.01); *G06F 17/30362* (2013.01); *G06F 17/30864* (2013.01)

(58) Field of Classification Search
CPC ................................................ G06F 17/30371
USPC .................................................. 707/638, 687
See application file for complete search history.

(56) References Cited

U.S. PATENT DOCUMENTS

| | | | |
|---|---|---|---|
| 8,805,793 B2* | 8/2014 | Patiejunas | G06F 17/30289 707/687 |
| 9,225,675 B2 | 12/2015 | Patiejunas et al. | |
| 9,262,462 B2 | 2/2016 | Merriman et al. | |
| 2005/0091237 A1 | 4/2005 | Bakalash et al. | |
| 2008/0068899 A1* | 3/2008 | Ogihara | G06F 3/0619 365/189.04 |
| 2012/0078978 A1 | 3/2012 | Shoolman et al. | |
| 2015/0074044 A1 | 3/2015 | Metreveli et al. | |

* cited by examiner

*Primary Examiner* — Chelcie L Daye
(74) *Attorney, Agent, or Firm* — Robert C. Kowert; Meyertons, Hood, Kivlin, Kowert & Goetzel, P.C.

(57) ABSTRACT

Consistent access to data objects transcending storage limitations in a non-relational data store may be provided. A data object may be stored in data chunks across separately accessible data items in a non-relational data store. Consistency indications may also be stored along with the data chunks in the data items that may be used to provide consistent access to the data object. When update to the data object is received, the data chunks and consistency indications of the data object may be retrieved and evaluated to determine if the data object is in a consistent state. If the data object is consistent, then the new versions of the data chunks and consistency indications may be generated. Authorization to update the data object may be obtained, and then the new versions stored in the data items in the non-relational data store.

20 Claims, 8 Drawing Sheets

PROVIDING CONSISTENT ACCESS TO DATA OBJECTS TRANSCENDING STORAGE LIMITATIONS IN A NON-RELATIONAL DATA STORE

BACKGROUND

Numerous business applications are being migrated to "cloud" environments in recent years. Data centers housing significant numbers of interconnected computing systems for cloud-based computing have become commonplace, such as private data centers that are operated by and on behalf of a single organization, and public data centers that are operated by entities as businesses to provide computing resources to customers. In addition to core computing resources, operators of some public data centers implement a variety of advanced network-accessible services, including, for example, distributed database services, object storage services and the like. Such storage-related services typically support very high levels of scalability, data durability and availability. By using the resources of public provider networks, clients can scale their applications up and down as needed, often at much lower costs that would have been required if the required computing infrastructure had to be set up on client-owned premises.

In particular storage services have grown in popularity due to the application of cloud-computing and other virtualization techniques. Non-relational data storage services, for instance, are increasingly well suited for handling large data sets as well as for highly interactive applications that frequently access data. While such storage services may provide a simplified model of data storage (as opposed to relational models of data storage) increasing performance and availability, some sacrifices in capability are incurred. For instance, various consistency guarantees may be comprised for accessing data maintained in non-relational data storage. Compensating for these sacrifices may expand the utility of non-relational storage services for applications that may be otherwise dependent upon capabilities like consistency guarantees.

Figure 1:
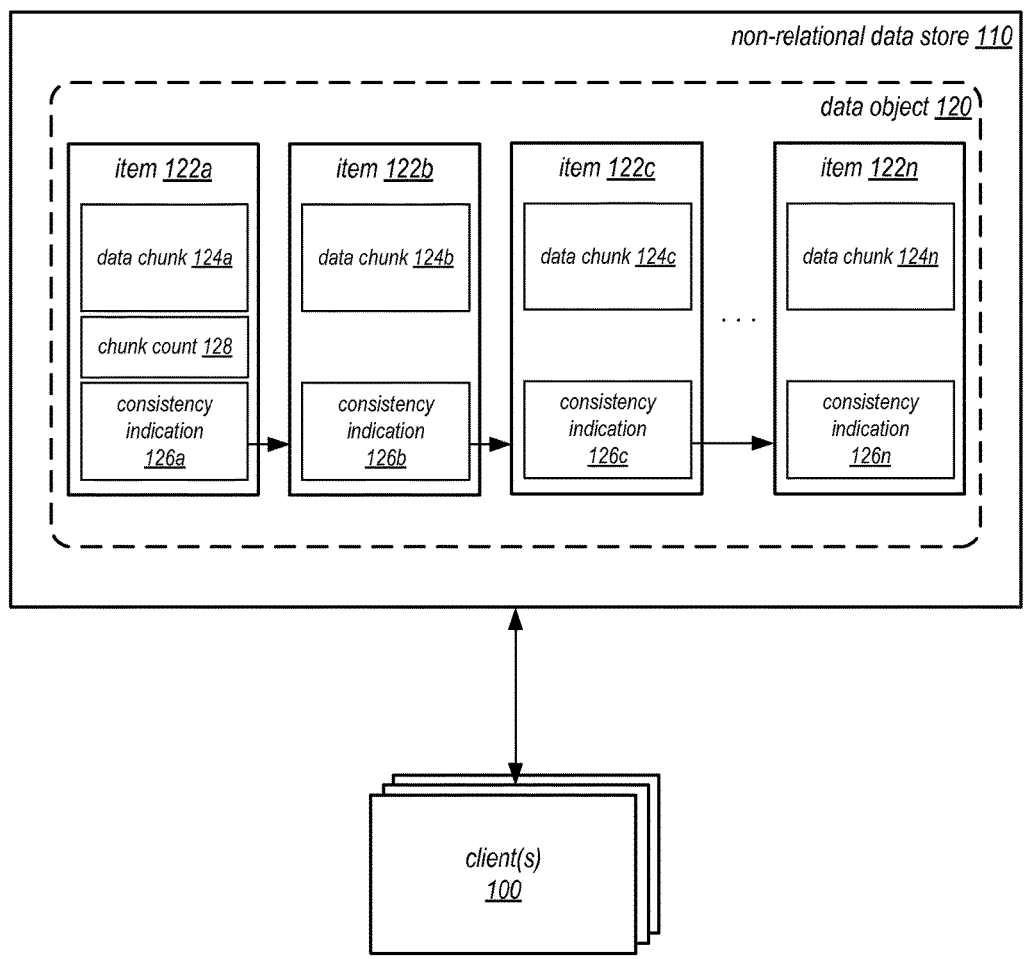
FIG. 1 is a logical illustration of providing consistent access to data objects transcending storage limitations in a non-relational data store, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Systems and methods described herein may be employed in various combinations and in various embodiments to provide consistent access to data object transcending storage limitations in a non-relational data store. A non-relational data store may provide a non-relational data model for data maintained in the non-relational data store. Various types of non-relational data stores may be implemented, such as column-based, document-based, key-value based, graph-based, and/or multi-model. Non-relational data stores do not typically provide full compliance with ACID properties of Atomicity of transactions that target data in a data store, maintaining Consistency within the data store, ensuring Isolation between the transactions that target the data, and Durability of transactions which are committed to the data store (as opposed to relational data stores which comply the ACID properties). For instance, some non-relational data stores provide consistency according to an eventually consistent model (which may or may not return a consistent value of data stored in the data store at given point in time—though after sufficient time the value returned may be consistent).

Ordinarily, applications and other systems or devices that utilize non-relational data stores may account for the lack of complete consistency by operating on data independently in separate storage locations (e.g., performing operations on separate records individually rather than as part of a larger transaction). However, for some applications this technique is unavailable. Data that needs to be treated as a single object, for instance, like a document, cannot be operated upon independently if stored in multiple locations. Thus, storage size limitations for a single data item (e.g., a record) in a non-relational database may limit the size of data objects which can be treated as a single object. Providing consistent access to data objects transcending storage limitations in a non-relational data store may allow data objects which exceed the size limitations of a non-relational data store to be treated as a single data object, even if stored in multiple separately accessible data items, in various embodiments.

FIG. 1 is a logical illustration of providing consistent access to data objects transcending storage limitations in a non-relational data store, according to some embodiments.

Non-relational data store 110 may provide a non-relational data model for storing data object 120, providing client(s) 100 access to data object 120 according to typical non-relational data store properties (e.g., fast access times and highly available data), as opposed to relational data stores. Data items 122 may be a unit or record of storage in non-relational data store 110 which provides the highest level of granularity at which an update may be performed, in some embodiments. Data items 122 may have multiple fields, attributes or values associated with or included in a data item. For instance, as illustrated in FIG. 1, data item 122*a* may include a data chunk attribute 124*a*, chunk count attribute 128, and consistency indication 126*a*.

Data object 120 may be any data or set of data that may be treated as a single object (e.g., a document, media file, consumable, or executable file). Data object 120 may be divided into separate data chunks 124. Data chunks 124 may be contiguous portions of data object 120, in various embodiments. For instance, each data chunk may represent a range of bytes of a data object (e.g., 200 KB), such that all of the data chunks 124 assembled may provide the complete data object. Consider the scenario where data object is an 800 KB data object and a storage limitation for a data items is 250 KB dividing the data object into data chunks data chunk 124*a* may be bytes 1-200 KB, data chunk 124*b* may be bytes 201-400 KB, data chunk 124*c* may be bytes 401-600 KB, and data chunk 124*n* may be bytes 601-800 KB. In addition to maintaining different data chunks 124, data items 122 may maintain consistency indications 126 which may be utilized to provide consistent access to the data object across the multiple data items 122*a*. For example, in at least some embodiments, a consistency indication 126 stored with one data chunk 124 may be evaluated with respect to another data chunk 124 of data object. Consider data object 120 in FIG. 1, consistency indication 126*a* may be evaluated to determine whether data chunk 124*a* is in a consistent state with respect to data chunk 124*b*. Consistency indications 126 may be represented in many different ways. A hash technique may be applied to a data chunk 124 that is next contiguous portion of the data object 120 to generate the consistency indication. For instance, consistency indication 126*a* may be a value that is generated by applying a hash technique to data chunk 124*b*, consistency indication 126*b* may be a value that is generated by applying the hash technique to data chunk 124*c*, consistency indication 126*c* may be a value that is generated by applying the hash technique to data chunk 124*n*, and consistency indication 126*n* as stored with the last data chunk 124*n* may be a value of the hash technique applied to a null value (i.e., a null value, as no other data chunk is part of the data object).

Consistent access to data object 120 may be provided, in various embodiments, according to the consistency indications 126 maintained along with the data chunks 124 in the respective data items 122. For instance, a request to read data object 120 may be performed by accessing item 122*a* to get data chunk 124*a*, chunk count 128 and consistency indication 126*a*. Chunk count 128 may indicate the number of remaining data chunks for the data object 120 and may be used to identify or locate the data chunks (e.g., as part of a key), in various embodiments. Remaining data items 122*b*, 122*c*, through 122*n* may be accessed, obtaining the respective data chunks 124*b*, 124*c*, and 124*n*, and obtaining the respective consistency indications 126*b*, 126*c*, and 126*n*. The consistency indications may then be evaluated with respect to the data chunks to determine whether the data chunks have changed. Consider the example given above, where each consistency indication is a hash value of the next contiguous portion of the data object 120. The same hash technique may be applied to data chunk 124, and if the value equals the consistency indication 126*c* in item 122*c*, then data chunk 122*n* is consistent. The same evaluation may be performed for data chunk 124*c*, applying the hash technique to data chunk 124*c* and comparing the result with consistency indication 126*b*, and so on until to determining that each of the consistency indications 126 is consistency with the next or adjacent portion of the data object in a data chunk. If the consistency indications 126 are consistent with the data chunks, then the data object is consistent and may be made available for a read access. If not, then the read request for the data object may be denied (or a previous version provided for read access).

An update to data object 120 may be performed in similar fashion, first getting data chunks 124 and consistency indications and determining whether the data object is consistent. If data object 120 is not consistent, then the update to the data object 120 may be denied or delayed until the data object is consistent. For instance, an inconsistent data object may be in the midst of having another client performing an update to the data object, and thus the denied update may be performed when the other update is complete. If, data object is consistent, then the update may be performed to the data object upon obtaining authorization to update the data object 120. New versions of one or more of the data chunks and consistency indications may be generated according to the update. If, for instance, a new value is to be written to bytes 24, 262 and 720, then the data chunks 122*a*, 122*b*, and 124*n* may be changed accordingly in the example given above where each data chunk stores 200 KB of an 800 KB data object. Authorization to update data object 120 may be provided in many ways. In some embodiments, optimistic locking techniques may be implemented to determine authorization to update data object 120. For instance, a conditional update (e.g., a request that will perform an update only if a condition is met) may be sent to update data chunk 124*a* and consistency indication 126*a* with the new values generated according to the update if the previously obtained data chunk and/or consistency values are the same. If another client or actor has changed data object 120 in between the determination of consistency and sending of the conditional update, then the request will fail and the update request be denied. If, the conditional update succeeds, then the remaining updates may be made to the other data chunks 124 and consistency indications 126. Other types of authorization techniques may be implemented, such as pessimistic locking techniques. In this way, ACID properties may be satisfied for access operations to update data object 120 (even though non-relational data store 110 does not provide a guarantee of ACID properties).

Please note that FIG. 1 is provided as a logical illustration of providing consistent access to data objects that transcend storage limitations of a non-relational data store. Various types of non-relational data stores may be implemented (in the same or different configurations), along with different numbers of clients, data chunks, or consistency indications.

This specification begins with a general description of a non-relational database service implemented by a provider network, which may provide consistent access to data objects transcending storage limitations in a non-relational data store. Then various examples of a non-relational database service are discussed, including different components/modules, or arrangements of components/module that may be employed as part of implementing the non-relational database service and clients. Various interactions between a non-relational database service and clients, as well as other systems, are described, as well as the various configurations of application clients that may utilize consistent access to data objects transcending storage limitations in a non-relational data store. A number of different methods and techniques to implement providing consistent access to data objects transcending storage limitations in a non-relational data store are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
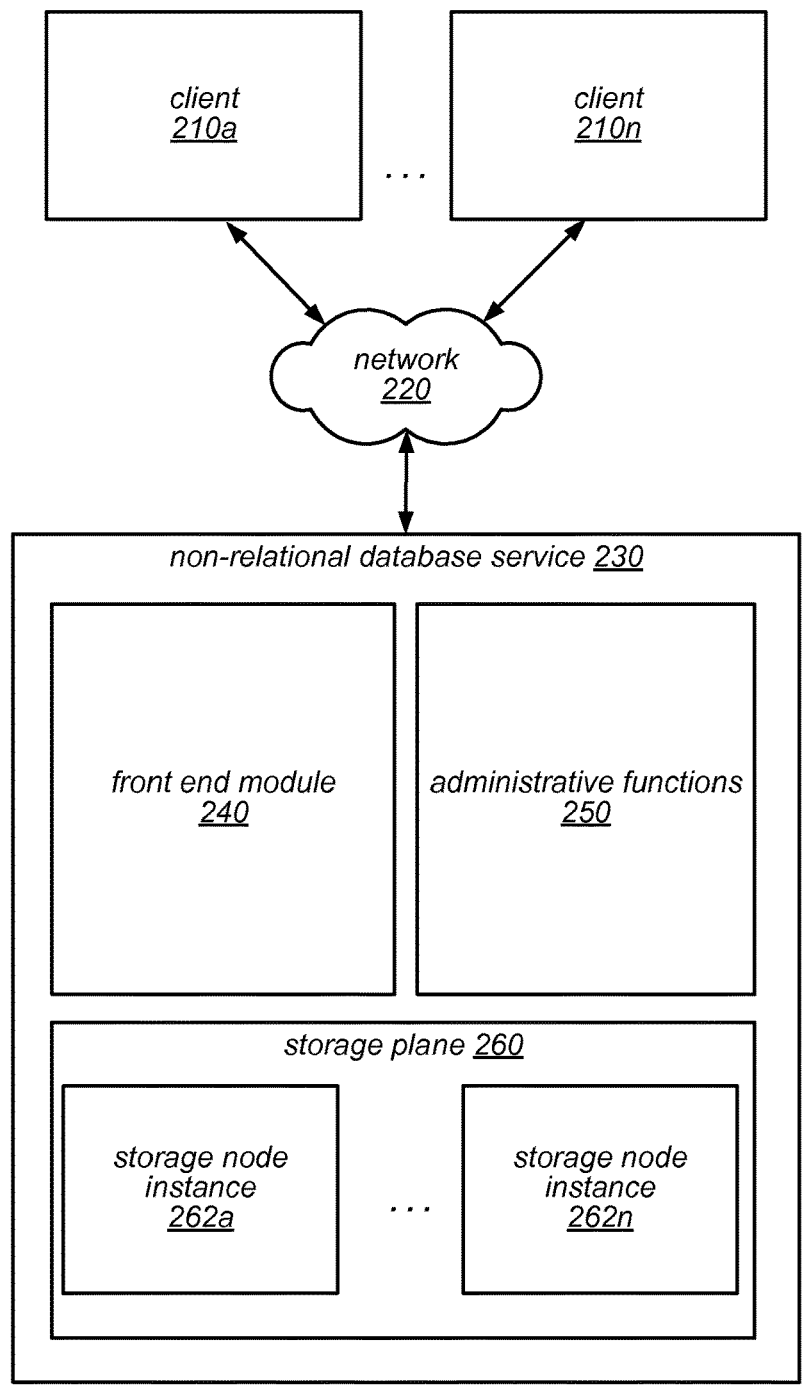
FIG. 2 is a block diagram illustrating an example database service that provides consistent access to data objects transcending storage limitations, according to some embodiments.

FIG. 2 is a block diagram illustrating an example database service that provides consistent access to data objects transcending storage limitations, according to some embodiments. While the database service discussed with regard to FIG. 2 is given to be a non-relational database service, similar architectures or schemas may be implemented to provide a relational database (or otherwise structured service), and thus the following description is not intended to be limiting as to the type of database for which scalable tracking of updates may be provided. It is noted that where one or more instances of a given component may exist, reference to that component herein below may be made in either the singular or the plural. However, usage of either form is not intended to preclude the other. In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 8 described below. In various embodiments, the functionality of a given computing system component may be implemented by a particular computing node or may be distributed across several computing nodes. In some embodiments, a given computing node may implement the functionality of more than one database service system component.

Non-relational database service 230 may implemented alone or as part of provider network. A provider network may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network, such as non-relational database service 230.

Generally speaking, database clients 210a-210n may encompass any type of client configurable to submit web services requests to non-relational database service 230 via network 220. For example, a given database client 210 may include a suitable version of a web browser, or a plug-in module or other type of code module configured to execute as an extension to or within an execution environment provided by a web browser to provide database or data storage service clients (e.g., client applications, users, and/or subscribers) access to the services provided by non-relational database service 230. Alternatively, a database client 210 may encompass an application such as a database application, media application, office application or any other application that may make use of persistent storage resources. For example, a database client 210 may be a client configured to request updates to a database maintained in non-relational database service 230. In some embodiments, such an application may include sufficient protocol support (e.g., for a suitable version of Hypertext Transfer Protocol (HTTP)) for generating and processing web services requests without necessarily implementing full browser support for all types of web-based data. That is, database client 210 may be an application configured to interact directly with non-relational database service 230. In various embodiments, database client 210 may be configured to generate web services requests according to a Representational State Transfer (REST)-style web services architecture, a document- or message-based web services architecture, or another suitable web services architecture. In at least some embodiments, database clients 210 may implement a query engine, such as query engine 310 discussed below with regard to FIG. 3, which may perform the various methods and techniques discussed below with regard to FIGS. 4-7 to provide access to a data object that transcends storage limitations of non-relational database service 230 for an individual data items.

Database clients 210 may convey web services requests to and receive responses from non-relational database service 230 via network 220. Similar to network 262 described above, in various embodiments, network 220 may encompass any suitable combination of networking hardware and protocols necessary to establish web-based communications between clients 210 and network-based storage service 230. For example, network 220 may generally encompass the various telecommunications networks and service providers that collectively implement the Internet. Network 220 may also include private networks such as local area networks (LANs) or wide area networks (WANs) as well as public or private wireless networks. For example, both a given database client 210 and non-relational database service 230 may be respectively provisioned within enterprises having their own internal networks. In such an embodiment, network 220 may include the hardware (e.g., modems, routers, switches, load balancers, proxy servers, etc.) and software (e.g., protocol stacks, accounting software, firewall/security software, etc.) necessary to establish a networking link between given database client 210, and the Internet as well as between the Internet and network-based storage service 230. It is noted that in some embodiments, database clients 210 may communicate with non-relational database service 230 using a private network rather than the public Internet. For example, clients 210 may be provisioned within the same enterprise as the data storage service (and/or the underlying system) described herein. In such a case, clients 210 may communicate with non-relational database service 230 entirely through a private network 220 (e.g., a LAN or WAN that may use Internet-based communication protocols but which is not publicly accessible).

Generally speaking, non-relational database service 230 may be configured to implement one or more service endpoints configured to receive and process web services requests, such as requests to access tables maintained on behalf of application providers and application clients by a database service or a data storage service, and/or the items and attributes stored in those tables. For example, non-relational database service 230 may include hardware and/or software configured to implement various service endpoints and to properly receive and process HTTP-based web services requests directed to those endpoints. In one embodiment, non-relational database service 230 may be implemented as a server system configured to receive web services requests from clients 210 and to forward them to various components that collectively implement a database system for processing. In at least some embodiments, non-relational database service 230 may implement a query engine, such as query engine 310 discussed below with regard to FIG. 3, which may perform the various methods and techniques discussed below with regard to FIGS. 4-7 to provide access to a data object that transcends storage limitations of non-relational database service 230 for an individual data items. In some embodiments, non-relational database service 230 may be configured as a number of distinct systems (e.g., in a cluster topology) implementing load balancing and other request management features configured to dynamically manage large-scale web services request processing loads.

As illustrated in FIG. 2, non-relational database service 230 may include a front end module 240 (which may be configured to receive, authenticate, parse, throttle and/or dispatch service requests, among other things). Non-relational database service 230 may also implement a component to provide administrative functions 250 (which may be configured to provide a variety of visibility and/or control functions, as described in more detail herein), and a storage plane 260, which includes a plurality of storage node instances (shown as 262a-262n), each of which may maintain and manage one or more tables on behalf of clients/users or on behalf of the non-relational database service (and its underlying system) itself. Some of the functionality provided by each of these types of components is described in more detail herein, according to various embodiments. Note that in some embodiments, non-relational database service 230 may include different versions of some of the components illustrated in FIG. 2 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 262a-360n, and each may store tables on behalf of clients. Some of these database instances may operate as if they were in a multi-tenant environment (storing data for different clients at a same storage node instance 262), and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

Front end module 240 may include one or more modules configured to perform parsing and/or throttling of service requests, authentication and/or metering of service requests, dispatching service requests, and/or maintaining a partition map cache. In addition to these component-specific modules, front end module 240 may include components that are common to multiple types of computing nodes that collectively implement network-based services platform 200, such as a message bus and/or a dynamic configuration module. In other embodiments, more, fewer, or different elements may be included in front end module 240, or any of the elements illustrated as being included in front end module 240 may be included in another component of non-relational database service 230 or in a component configured to interact with non-relational database service 230 to provide the data storage services described herein.

Administrative functions 250 may also be implemented by non-relational database service 230. These may include one or more modules configured to provide visibility and control to system administrators, or to perform heat balancing, and/or anomaly control, and/or resource allocation. Administrative functions 250 may also include an admin console, through which system administrators may interact with key value data store (and/or the underlying system). In some embodiments, admin console may be the primary point of visibility and control for the database service (e.g., for configuration or reconfiguration by system administrators). For example, admin console may be implemented as a relatively thin client that provides display and control functionally to system administrators and/or other privileged users, and through which system status indicators, metadata, and/or operating parameters may be observed and/or updated.

Storage node instances 262 may include one or more modules configured to provide partition management, to implement replication and failover processes, and/or to provide an application programming interface (API) to underlying storage. Various different ones of administrative and/or control plane operations may be performed locally (e.g., on a given storage node instance 262) based, e.g., on one or more measures of the utilization of provisioned resources on the storage devices or logical storage volumes of the storage node instance.

As noted above, different storage nodes 262 may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a leader node, performing special functions with regard to access requests directed toward the partition maintained by replica group 1. For replica group 2, however, storage node B may be the leader node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 262 may include a storage engine, which may be configured to maintain (i.e. to store and manage) one or more tables (and associated table data) in storage (which in some embodiments may be a non-relational database) on behalf of one or more clients/users. In addition to these component-specific modules, storage node instance 262 may include components that are common to the different types of computing nodes that collectively implement non-relational database service 230, such as a message bus and/or a dynamic configuration module. In other embodiments, more, fewer, or different elements may be included in storage node instance 262, or any of the elements illustrated as being included in storage node instance 262 may be included in another component of network-based storage service 230 or in a component configured to interact with network-based storage service 230 to provide the data storage services described herein.

The systems underlying the database service described herein may store data on behalf of database service clients (e.g., client applications, users, and/or subscribers) in tables containing items that have one or more attributes. In some embodiments, the database service may present clients/users with a data model in which each table maintained on behalf of a client/user contains one or more items, and each item includes a collection of attributes, such as a key value data store. The attributes of an item may be a collection of name-value pairs, in any order. For example, the attributes of an item may be a data chunk, and portion of a data object, a chunk count, and a number representing the number of data chunks, a consistency indication, and the value of the consistency indication. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

In various embodiments, non-relational database service 230 may be configured to support different types of web services requests. For example, in some embodiments, network-based storage service 230 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In various embodiments, the data storage service described herein may provide an application programming interface (API) that includes support for some or all of the following operations on the data in a table maintained by the service on behalf of a storage client: put (or store) an item, conditional put (or store) an item in response to determining that a specified condition of the item is satisfied, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

Figure 3:
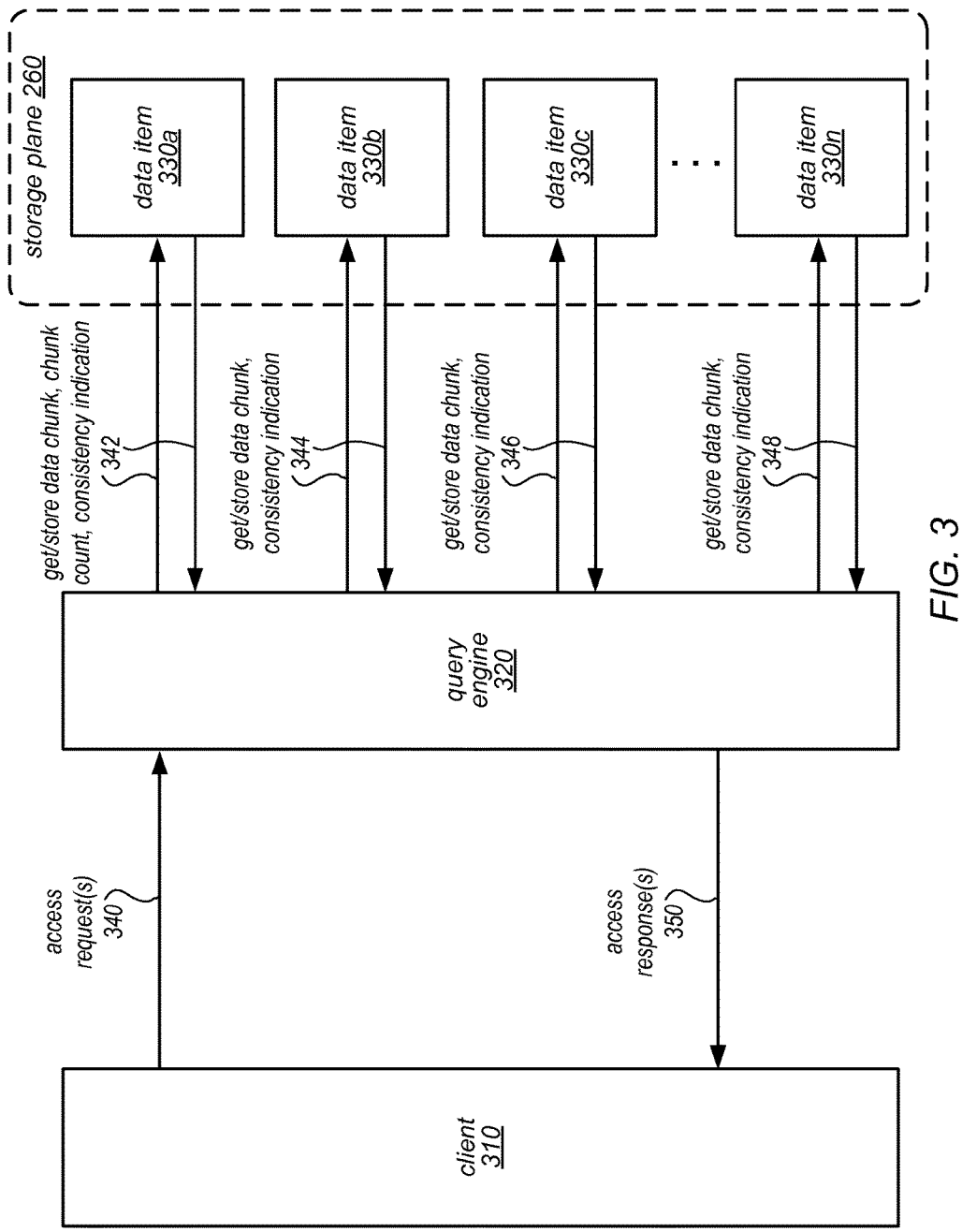
FIG. 3 is a block diagram illustrating various interactions among a client, query engine, and according to some embodiments.

FIG. 3 is a block diagram illustrating various interactions among a client, query engine, and according to some embodiments. Client 310 may be a client 210, such as discussed above with regard to FIG. 2. Query engine 320 may be implemented as part of a client (e.g., as part of client 210) or as part of a request handling layer or component, such as storage engine at a storage node 262 discussed above in FIG. 2). Thus, as illustrated in FIG. 3, access requests 340 and response(s) 350 may be requests via network communication (e.g., according to an API or other network format) or may be internal communications (e.g., function or procedure calls invoking the functionality of one application from another). As discussed above with regard to FIG. 1, the different data items 330 may be separately accessible. Thus, different requests 342, 344, 346, and 348 may be made to each data item 330 in storage plane 262. For instance, when reading a data object, as discussed below with regard to FIG. 6, first the data chunk, chunk count, and consistency indication may be retrieved 342 from a data item 330*a* maintaining the first data chunk. Then other requests (e.g., requests 344, 346, and 348) may be sent to get the remaining data chunks and consistency indications. Similarly, a conditional put/store may be made 342 with respect to data item 330*a* to store a new version of a first data chunk/consistency indication, as part of updating the data object, as discussed below with regard to FIG. 4. Requests may be made to some data items in or near parallel (e.g., requests to retrieve or store to remaining data items 330*b*-330*n*) as discussed below with regard to FIGS. 4 and 6, in order to reduce latency for providing consistent access to a data object stored across multiple data items to only twice the latency of a single access request of a data item, in some embodiments. Although data items 330 are illustrated as part of storage plane 260 for non-relational database service 230, in some embodiments, different data items (and thus data chunks) may be stored across different non-relational data stores (e.g., different services or systems that provide non-relational data storage). Thus, query engine 320 may be configured to perform the requests (342, 344, 346, and 348) with respect to different non-relational data stores according to varying request format, APIs, or other communication protocols for communicating with the different non-relational data stores.

Figure 4:
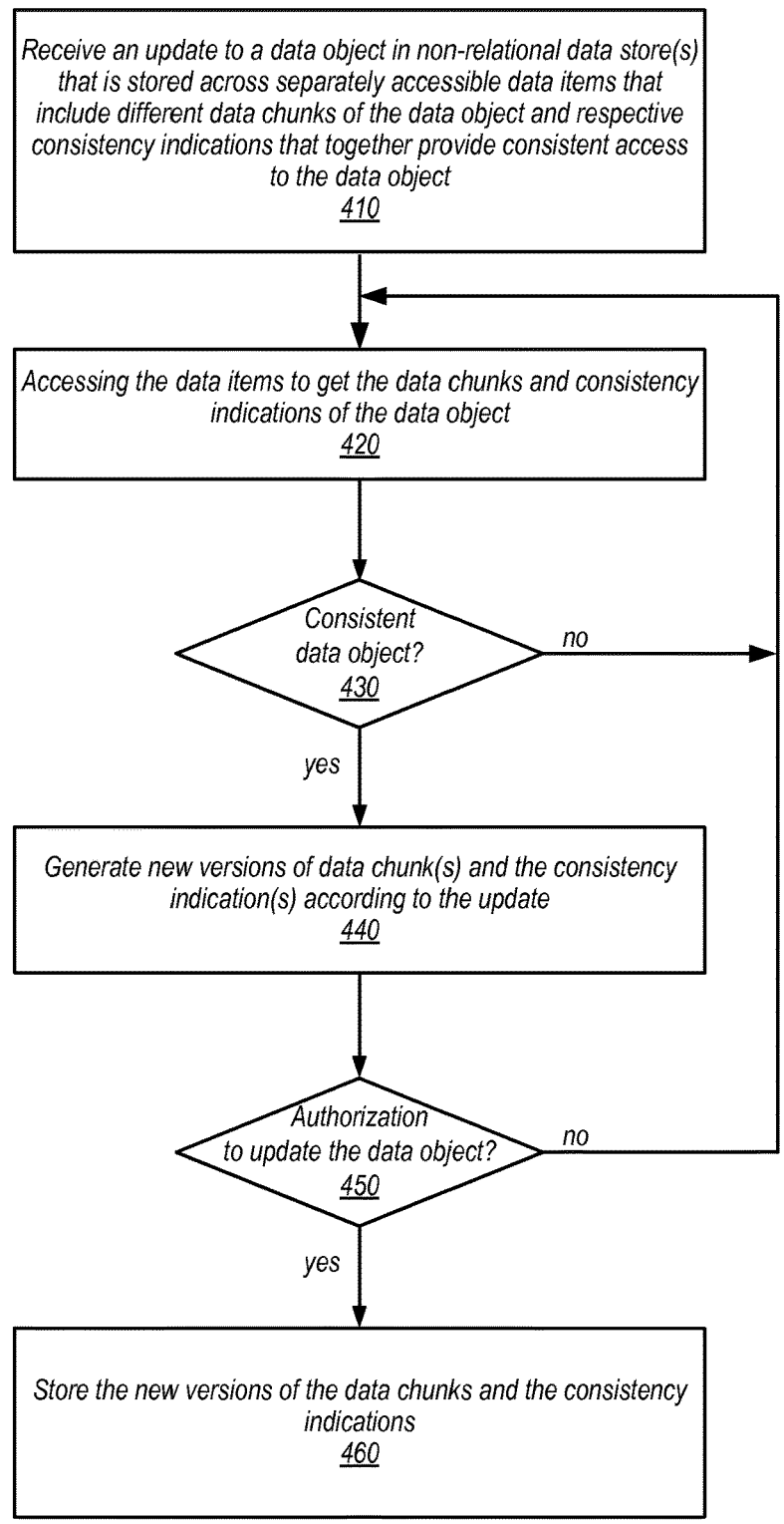
FIG. 4 is a high-level flowchart illustrating various methods and techniques for updating data objects transcending storage limitations in a non-relational data store, according to some embodiments.

The examples of providing consistent access to data objects transcending storage limitations in a non-relational data store in FIGS. 2-3 have been given in regard to a non-relational database service. However, various other types of non-relational data stores that may provide consistent access to data objects transcending storage limitations in a non-relational data store. FIG. 4 is a high-level flowchart illustrating various methods and techniques for updating data objects transcending storage limitations in a non-relational data store, according to some embodiments. These techniques may be implemented using one or multiple databases as described above with regard to FIGS. 2-3, as well as other databases and/or different implementations of a client and/or query engine, and thus the following discussion is not intended to be limiting as to the other types or configurations of non-relational data stores that may implement the described techniques.

A data object, as discussed above, with regard to FIG. 1, may be any data or set of data that may be treated as a single object (e.g., a document, media file, consumable, or executable file). Data objects may be divided into separate data chunks, which may be contiguous portions of a data object, in various embodiments. For instance, each data chunk may represent a range of bytes of a data object (e.g., 200 KB), such that all of the data chunks assembled may provide the complete data object. These data chunks may be maintained in separately accessible data items or records within one or more non-relational data stores (e.g., as discussed above with regard to FIG. 3). In addition to dividing the data object into different data chunks, consistency indications may be maintained along with the data chunks which may be utilized to provide consistent access to the data object across separately accessible data items. For example, in at least some embodiments, a consistency indication stored with one data chunk may be evaluated with respect to another data chunk of data object that is a contiguous portion of the data object. For example, a consistency indication stored with a data chunk storing bytes 1-50 KB of a data object may be used to evaluate the consistency of a data chunk storing bytes 51-100 KB. In some embodiments, the number of data chunks may be determined for a data object automatically (e.g., by a non-relational data store) according to storage size limitations (e.g., creating data chunks that are 90% of a storage size limit, such as 9 KB out of 10 KB limit) or according to other considerations, such as an optimal number of data chunks for network bandwidth and/or throughput performance. In at least some embodiments, a client may specify the number of data chunks when uploading a data object in excess of the storage size limit. Please note, that although the previous techniques have been described in the context of data objects that exceed a storage size limitation for a data item in a non-relational data store, the same techniques may performed for a data object that does not exceed the storage size limitations of a data store.

As indicated at 410, an update to a data object stored across separately accessible data items that include different data chunks of the data object and respective consistency indications that together provide consistent access to the data object may be received, in some embodiments. The update request may, in some embodiments, indicate that the data object is a "distributed" data object located in multiple locations, or may simply identify the data object as part of normally formatted update request (e.g., the same as request to update a single data item in the non-relational data store). As noted above with regard to FIG. 3, the update request may be received from an application at a query engine implemented at a client or may be received at a query engine implemented as part of a request handler at the non-relational data store. The update request may indicate the change to be made to the data object (e.g., the affect data bytes and new values to store). In at least some embodiments, the update may be a request to delete the data object. A deletion marker indicating that the data object is to be deleted may be stored (as discussed below at 460) if the update is authorized to perform so that when processing subsequent read or update requests it may be discernable that the data object is marked for deletion (e.g., by a background cleanup process).

As indicated at 420, the data items of the data object may be accessed to get the data chunks and consistency indications, in various embodiments. For example, a read request may be sent to get the data chunk, chunk count, and consistency indication of the first data item for a data object. Based on the chunk count (which may be a count of the number of data chunks that make up the data object) additional read requests may be sent in-parallel (or near parallel) to the other data items to get the remaining data chunks and consistency indications. For instance, if the non-relational data store is a key value store, the count number may be used as a range key in combination with another value (e.g., the data object name or identifier) to locate individual data items of the data object.

As indicated at 430, determination may be made as to whether the version of the data object is consistent. Consider the example discussed above, a hash technique (e.g., SHA256) may be applied to generate the consistency indications. The consistency indication in located with a data chunk in a data item may be used to evaluate the data chunk storing the next contiguous portion of the data object in another data item. In this way a change to any one of the data chunks will result in a consistency indication that does not match the hash value generated from applying the hash technique to the next data chunk. Other techniques to generate consistency values may be implemented. In some embodiments, for instance, version identifiers may be utilized to provide indications of consistency between data chunks. For example, instead of a hash value generated based on an adjacent data chunk, each consistency indication may contain a monotonically increasing version number for the data chunk (with which the consistency indication is collocated) and the version number for the adjacent data chunk). Every time the data chunks are updated, the version number for the data chunk is increased. The expected version number at the adjacent data chunk may also be updated. If, however, when evaluating consistency indications the version numbers do not match, then the data chunk is not consistent.

Figure 5:
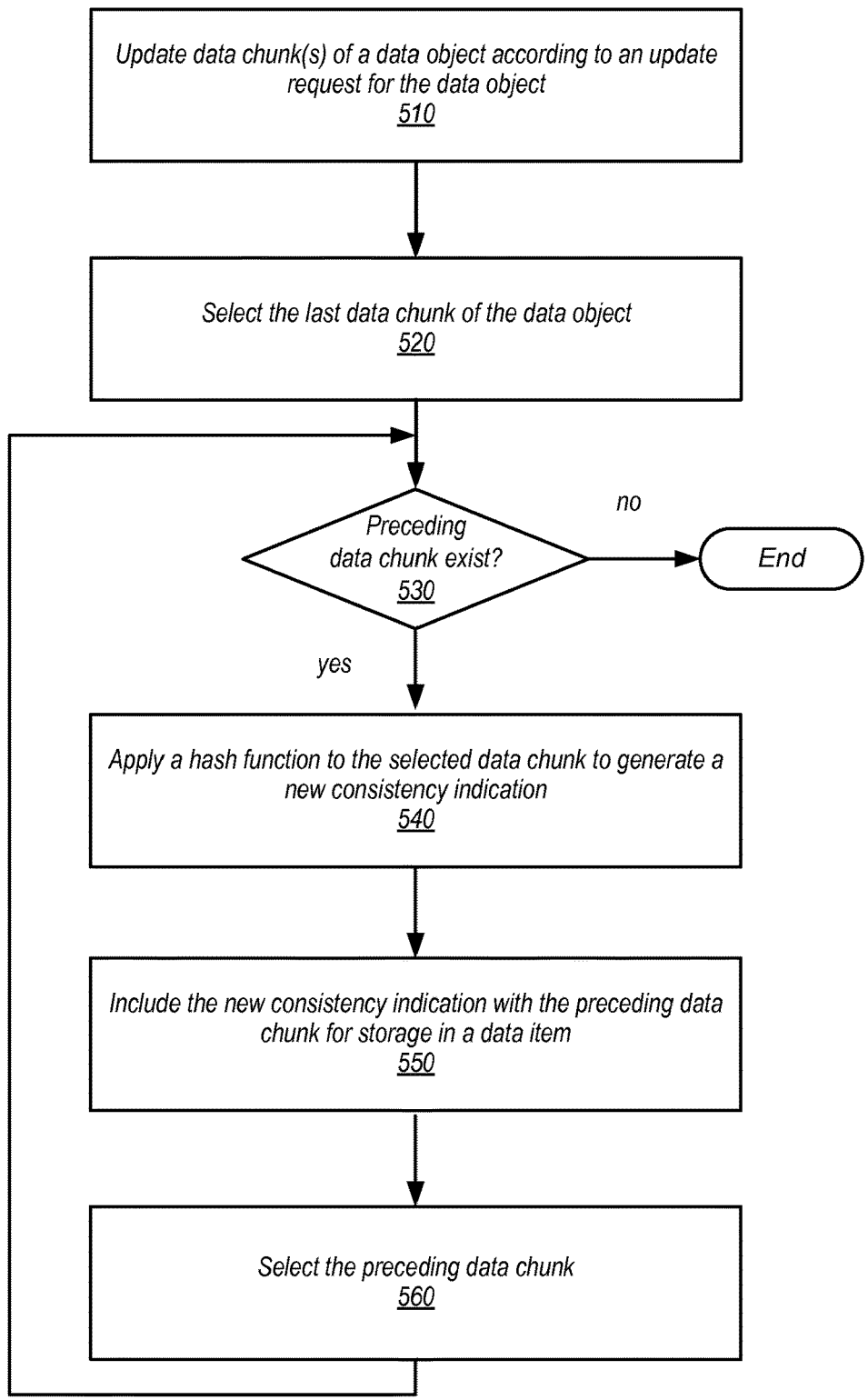
FIG. 5 is a high-level flowchart illustrating various methods and techniques for generating new versions of data chunks and consistency indicators for a data object, according to some embodiments.

As indicated by the negative exit from 430, if the data object is not consistent, then the technique may try again to get a consistent data object (e.g., an update or change to the data object may have completed). Alternatively, in some embodiments, the update request may be denied. If, however, the data object is consistent, then the data object may be updated. For example, as indicated at 440, new versions of one or more of the data chunks and the consistency indications may be generated. The new versions of the consistency indications may be generated according to the technique in which they are evaluated (e.g., as a hash of a data chunk or version number). FIG. 5 is a high-level flowchart illustrating various methods and techniques for generating new versions of data chunks and consistency indicators for a data object, according to some embodiments.

As indicated at 510, the data chunks of the data object may be updated according to the request for the data object, in various embodiments. Thus, any changes, additions, deletions, or other modifications to data in the data object may be made upon the obtained data chunks (as discussed above at element 420 in FIG. 4). To generate the consistency indicators for the data chunks, the data chunks may then be evaluated in reverse adjacency order, in some embodiments. For instance, as indicated at 520, the last data chunk may be selected. As multiple data chunks are used, then a preceding data chunk will exist, as indicated by the positive exit from 530. A hash function may be applied to the selected data chunk to generate the new consistency indication, as indicated at 540. The new consistency indication may then be included with the preceding data chunk, as indicated at 550 when being stored in the data item in the non-relational data store. Then, the preceding data chunk may be selected, as indicated at 560, for generating a consistency indication until the first data chunk is reached, as indicated by the negative exit from 530.

Turning back to FIG. 4, once the updated version of data chunk(s) and consistency indication(s) are performed, then it may be determined whether authorization exists to update the data object. For instance, a pessimistic locking mechanism may be implemented in some embodiments. Consider the scenario where a lock field is set for a data object (e.g., in the data item containing the first data chunk). A client may write a value (e.g., a client id or other information) to reserve the data object for writing. If the lock on the data object is reserved or held by another client, application, or process, then as indicated by the negative exit from 450, the update may be tried again by first obtaining a consistent version of the data object. Alternatively, in some embodiments, the update request may be denied. An optimistic locking scheme may be implemented in some embodiments, so that a determination of authorization to update the data object may be performed by detecting whether another client, application, and/or process is currently writing to the data object. For instance, as noted above, a conditional update request may be sent to update the first data chunk with the condition be that the data chunk and/or consistency indication have the same state or value as obtained, at element 420. If the update is not performed because the condition is not satisfied, then another client, application, and/or process may be updating the data object, so authorization is not granted to update the data object. Please note that various other locking schemes may be implemented, and thus the previous examples of determining authorization are not intended to be limiting.

As indicated at 460, if authorization is determined to update, then the new versions of the data chunk(s) and the consistency indication(s) may be stored in the respective data items of the data object in the non-relational data store. Write or update requests may be sent for each data item in-parallel or near parallel.

The techniques described above may be implemented by a client (e.g., as part of an application or query engine) that is accessing a non-relational data store (e.g., a non-relational database service). Similarly, the techniques described above may be implemented as part of a request handling layer or other portion of a non-relational data store to provide consistent access to data objects transcending storage limitations in a way that is invisible to clients (e.g., without requiring special commands, requests, or instructions). In at least some embodiments, techniques to update a data object may be implemented as part of a workflow or other application, system, or device that upon interruption (e.g., due to a system or other failure) may resume the update technique (e.g., finish storing new versions of data chunks and/or consistency indications in the data items). In at least some embodiments, a roll-back technique may be implemented to remove incomplete updates that are not performed for the data object after a period of time.

Figure 6:
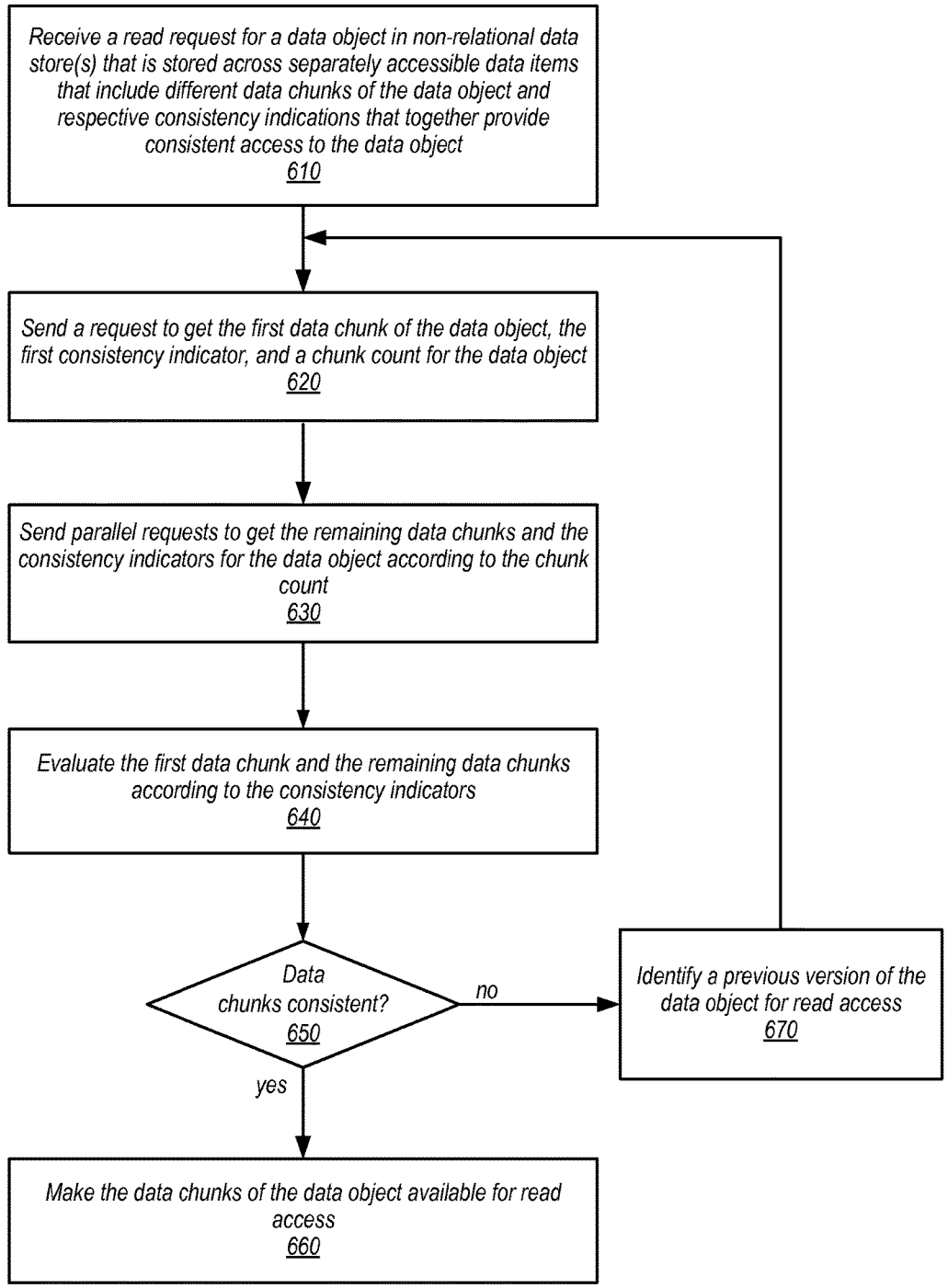
FIG. 6 is a high-level flowchart illustrating various methods and techniques for reading data objects transcending storage limitations in a non-relational data store, according to some embodiments.

FIG. 6 is a high-level flowchart illustrating various methods and techniques for reading data objects transcending storage limitations in a non-relational data store, according to some embodiments. As indicated at 610, a read request for a data object stored across separately accessible data items that include different data chunks of the data object and respective consistency indications that together provide consistent access to the data object may be received, in some embodiments. The read request may, in some embodiments, indicate that the data object is a "distributed" data object located in multiple locations, or may simply identify the data object as part of normally formatted update request (e.g., the same as request to update a single data item in the non-relational data store). As noted above with regard to FIG. 3, the read request may be received from an application at a query engine implemented at a client or may be received at a query engine implemented as part of a request handler at the non-relational data store.

As discussed above, the data items of the data object may be accessed to get the data chunks and consistency indications, in various embodiments. For example, a read request may be sent to get the data chunk, chunk count, and consistency indication of the first data item for a data object, as indicated at 620. Based on the chunk count (which may be a count of the number of data chunks that make up the data object) additional read requests may be sent in-parallel (or near parallel) to the other data items to get the remaining data chunks and consistency indications, as indicated at 630. If the non-relational data store is a key value store, the count number may be used as a range key in combination with another value (e.g., the data object name or identifier) to locate individual data items of the data object. In this way latency behavior for providing consistent access to a data object that transcends storage size limitations may be as low as the cost of sending two separate read requests.

Figure 7:
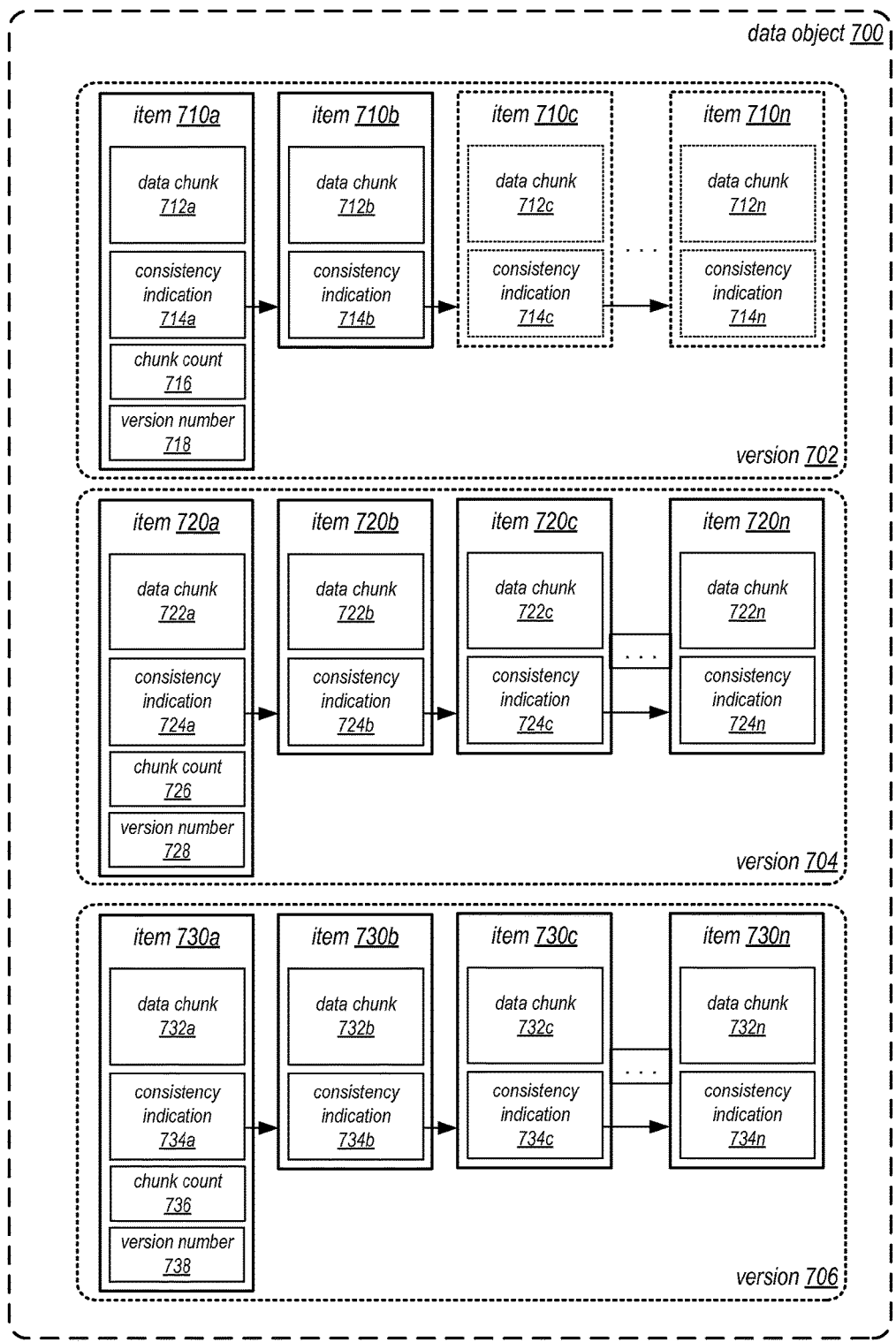
FIG. 7 is a logical diagram illustrating multiple versions of a data object that transcends storage limitations in a non-relational data store maintained for read access, according to some embodiments.

As indicated at 640, the first data chunk and remaining data chunks may be evaluated according to the consistency indicators, in various embodiments. The same techniques may be performed as discussed above with regard to FIG. 4, such as applying hash techniques to adjacent data chunks or comparing version numbers between data chunks. If the data chunks are consistent, then the data object may be made available for read access, as indicated at 660. In at least some embodiments, if the data chunks are not consistent, then the read request may be denied. In some embodiments, though the data chunks may be inconsistent, it may be desirable to allow previous versions of the data object to be read. FIG. 7 is a logical diagram illustrating multiple versions of a data object that transcends storage limitations in a non-relational data store maintained for read access, according to some embodiments.

As indicated at 670, a previous version of the data object may be identified for read access if the data chunks are not consistent. For instance, data object 700 in FIG. 7, has multiple versions, 702, 704, and 706. Each respective version may have separate data items (710*a*-710*n*, 720*a*-720*n*, and 730*a*-730*n*) storing the data chunks (712*a*-712*n*, 722*a*-722*n*, and 732*a*-732*n*), consistency indications (714*a*-714*n*, 724*a*-724*n*, and 734*a*-734*n*), chuck counts (716, 726, and 736), and version numbers (718, 728, and 738) that make up the different versions of the data object maintained in the non-relational data store. For instance, if items 710*c* and 710*n* are inconsistent with items 710*a* and 710*b* in version 702, then version number 729 may be provided to re-direct a read request to version 704. In at least some embodiments, a clean-up or garbage collection algorithm may be implemented to remove older versions of a data object after a period of time (or after exceeding some garbage collection limit). Different versions may be maintained in different non-relational data stores, in some embodiments.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the structured data store services/systems and/or delegation services/systems described herein). The various methods as illustrated in the figures and described herein represent example embodiments of methods. The order of any method may be changed, and various elements may be added, reordered, combined, omitted, modified, etc.

Figure 8:
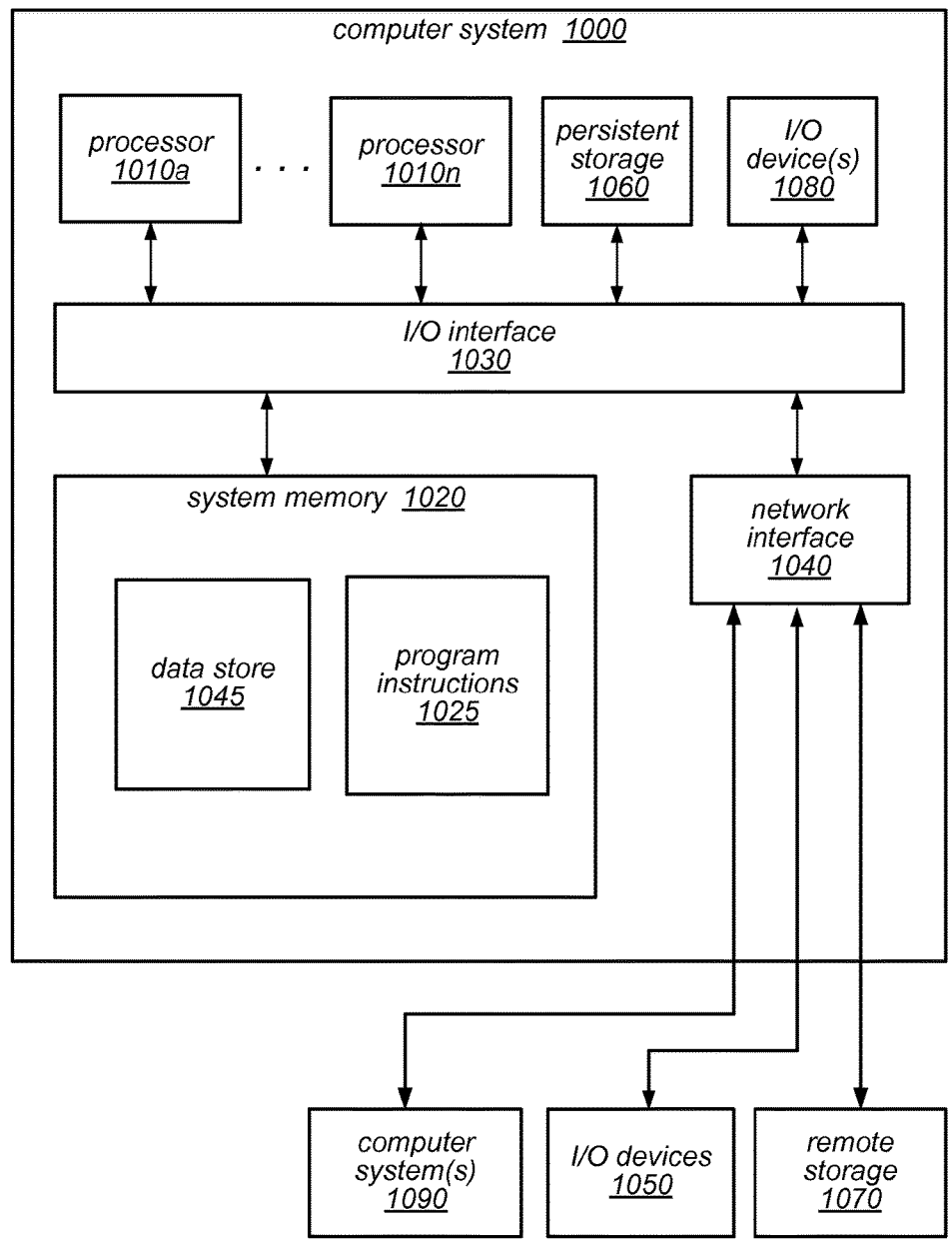
FIG. 8 is a block diagram illustrating an example computing system, according to some embodiments.

Embodiments of providing consistent access to data objects transcending storage limitations in non-relational data stores as described herein may be executed on one or more computer systems, which may interact with various other devices. FIG. 8 is a block diagram illustrating an example computer system, according to various embodiments. For example, computer system 1000 may be configured to implement nodes of a delegation service, a structured data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database service, or other non-relational data store, query engine, and/or client, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor;
   a system memory, storing program instructions that when executed by the at least one processor cause the at least one processor to implement a query engine:
   the query engine, configured to:
      receive an update to a data object in a non-relational data store that is stored across a plurality of separately accessible data items in the non-relational data store, wherein the data items comprise different data chunks of the data object and respective consistency indications that together provide consistent access to the data object;
      in response to receipt of the update:
         read the data items to get the data chunks and the consistency indications of the data object;
         in response to a determination that the data object is consistent according to the consistency indications, generate new versions of one or more of the data chunks and the consistency indications according to the update; and
         in response to a detection of authorization to update the data object, write the new versions of the data chunks and the consistency indications to the data items.

2. The system of claim 1
   wherein a data item of the data items storing a first data chunk of the data chunks comprises a chunk count of the data chunks, wherein the data chunks are logically contiguous portions of the data object;
   wherein to read the data items to get the data chunks and the consistency indications of the data object, the query engine is configured to:

access the data item storing the first data chunk to get the first data chunk, a first consistency indication of the consistency indications, and the chunk count;

access in parallel remaining data items of the data items storing other data chunks of the data chunks according to the chunk count to get the other data chunks and other consistency indications of the consistency indications; and wherein to determine that the data object is consistent according to the consistency indications, the query engine is configured to evaluate the consistency indications with respect to the data chunks, wherein an evaluation of a consistency indication comprises an evaluation of the consistency indication stored with a data chunk in a data item with respect to another data chunk that is a next contiguous portion of the data object stored in a different data item.

3. The system of claim 2, wherein the consistency indications are hash values generated from the application of a hash technique to different ones of the contiguous portions of the data object.

4. The system of claim 1, wherein the non-relational data store is a network-based database service, and wherein the query engine is implemented as part of a client of the network-based database service.

5. A method, comprising:
performing, by one or more computing devices:
receiving an update to a data object in one or more non-relational data stores that is stored across a plurality of separately accessible data items in the one or more non-relational data stores, wherein the data items comprise different data chunks of the data object and respective consistency indications that together provide consistent access to the data object;

in response to receiving the update:
accessing the data items to get the data chunks and the consistency indications of the data object;
in response to determining that the data object is consistent according to the consistency indications, generating new versions of one or more of the data chunks and the consistency indications according to the update; and
in response to detecting authorization to update the data object, storing the new versions of the data chunks and the consistency indications in the data items.

6. The method of claim 5,
wherein a data item of the data items storing a first data chunk of the data chunks comprises a chunk count of the data chunks, wherein the data chunks are logically contiguous portions of the data object;
wherein accessing the data items to get the data chunks and the consistency indications of the data object comprises:
accessing the data item storing the first data chunk to get the first data chunk, a first consistency indication of the consistency indications, and the chunk count;
accessing remaining data items of the data items storing other data chunks of the data chunks according to the chunk count to get the other data chunks and other consistency indications of the consistency indications; and
wherein determining that the data object is consistent according to the consistency indications comprises:
evaluating the consistency indications with respect to the data chunks, wherein an evaluation of a consistency indication comprises an evaluation of the consistency indication stored with a data chunk in a data item with respect to another data chunk that is a next contiguous portion of the data object stored in a different data item.

7. The method of claim 5, further comprising:
receiving a request to read the data object;
in response to receiving the request:
accessing the data item storing the first data chunk to get the first data chunk, a first consistency indication of the consistency indications, and the chunk count;
accessing remaining data items of the data items storing other data chunks of the data chunks according to the chunk count to get the other data chunks and other consistency indications of the consistency indications;
evaluating the consistency indications with respect to the data chunks to determine that the data object is inconsistent, wherein an evaluation of at least one of the consistency indications with respect to another data chunk that is a next contiguous portion of the data object determines that the at least one consistency indication is inconsistent with respect to the other data chunk; and
denying the read request.

8. The method of claim 5, further comprising
receiving another update to the data object;
in response to receiving the update:
accessing the data items to get the data chunks and the consistency indications of the data object; and
in response to determining that the data object is inconsistent according to the consistency indications, denying the update to the data object.

9. The method of claim 5, wherein the data chunks are logically contiguous portions of the data object, and wherein the consistency indications are hash values generated from the application of a hash technique to different ones of the contiguous portions of the data object.

10. The method of claim 5, further comprising
receiving a request to read the data object;
in response to receiving the request:
accessing the data items to get the data chunks and the consistency indications of the data object;
in response to determining that the data object is inconsistent according to the consistency indications, identifying a previous version of the data object maintained in the one or more non-relational data stores for read access.

11. The method of claim 5, wherein the one or more computing devices are implemented as part of a non-relational data store of the one or more non-relational data stores.

12. The method of claim 5, wherein the data object is larger than storage size limit for a data item of the one or more non-relational data stores.

13. The method of claim 5, wherein the one or more non-relational data stores are a one or more network-based database services, and wherein the data object is maintained for a client of the one or more network-based database services.

14. A non-transitory, computer-readable storage medium, storing program instructions that when executed by one or more computing devices cause the one or more computing devices to implement:
receiving an update to a data object in one or more non-relational data stores that is stored across a plurality of separately accessible data items in the one or more non-relational data stores, wherein the data items comprise different data chunks of the data object and respective consistency indications that together provide consistent access to the data object;

in response to receiving the update:
  accessing the data items to get the data chunks and the consistency indications of the data object;
  in response to determining that the version of the data object is consistent according to the consistency indications, generating new versions of one or more of the data chunks and the consistency indications according to the update; and
  in response to detecting authorization to update the data object, storing the new versions of the data chunks and the consistency indications in the data items.

15. The non-transitory, computer-readable storage medium of claim 14,
  wherein a data item of the data items storing a first data chunk of the data chunks comprises a chunk count of the data chunks, wherein the data chunks are logically contiguous portions of the data object;
  wherein, in accessing the data items to get the data chunks and the consistency indications of the data object, the program instructions cause the one or more computing devices to implement:
    accessing the data item storing the first data chunk to get the first data chunk, a first consistency indication of the consistency indications, and the chunk count;
    accessing remaining data items of the data items storing other data chunks of the data chunks according to the chunk count to get the other data chunks and other consistency indications of the consistency indications; and
  wherein determining that the data object is consistent according to the consistency indications, the program instructions cause the one or more computing devices to implement:
    evaluating the consistency indications with respect to the data chunks, wherein an evaluation of a consistency indication comprises an evaluation of the consistency indication stored with a data chunk in a data item with respect to another data chunk that is a next contiguous portion of the data object stored in a different data item.

16. The non-transitory, computer-readable storage medium of claim 14, wherein the program instructions cause the one or more computing devices to further implement:
  receiving another update to the data object;
  in response to receiving the other update:
    accessing the data items to get the data chunks and the consistency indications of the data object;
    in response to determining that the version of the data object is consistent according to the consistency indications, generating new versions of one or more of the data chunks and the consistency indications according to the other update; and
    in response to determining lack of authorization to perform the other update with respect to the data object, denying the other update to the data object.

17. The non-transitory, computer-readable storage medium of claim 14, wherein the update to the data object is a delete request for the data object, and wherein storing the new versions of the data chunks and the consistency indications in the data items comprises storing a deletion marker for deleting the data object at one or more of the data items.

18. The non-transitory, computer-readable storage medium of claim 14, wherein detecting authorization to update the data object is performed according to an optimistic locking technique that performs a conditional write request to update a data item of the data object, wherein the conditional write request specifies a current state of the data item as a condition for performing the write request.

19. The non-transitory, computer-readable storage medium of claim 14, wherein the program instructions cause the one or more computing devices to further implement:
  receiving a request to read the data object;
  in response to receiving the request:
    accessing the data items to get the data chunks and the consistency indications of the data object;
    in response to determining that the data object is inconsistent according to the consistency indications, identifying a previous version of the data object maintained in the one or more non-relational data stores for read access.

20. The non-transitory, computer-readable storage medium of claim 14, wherein the one or more non-relational data stores are one or more network-based database services, and wherein the one or more computing devices implement a client of the one or more network-based database services.

* * * * *